E. HUBBARD.
MOTIVE FLUID SUPPLY VALVE.
APPLICATION FILED JAN. 13, 1909.
999,033.
Patented July 25, 1911.
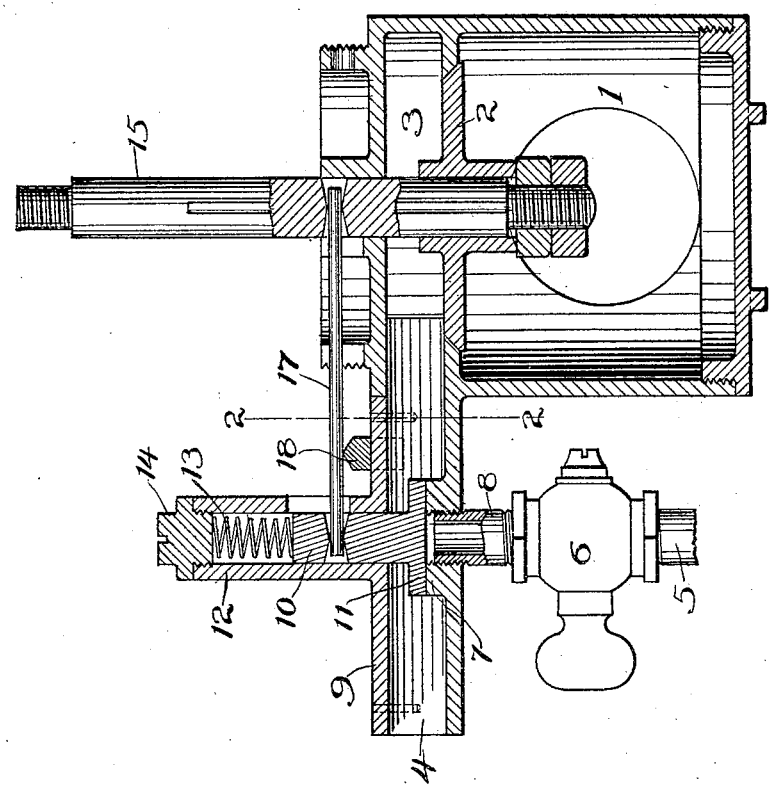
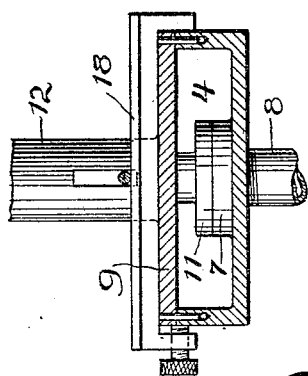
Witnesses:
Frank J. Blanchard
J. S. Abbott
Inventor:
Eber Hubbard
By Burton & Burton
Attorneys.

UNITED STATES PATENT OFFICE.

EBER HUBBARD, OF CHICAGO, ILLINOIS.

MOTIVE-FLUID-SUPPLY VALVE.

999,033. Specification of Letters Patent. Patented July 25, 1911.

Original application filed July 6, 1908, Serial No. 441,945. Divided and this application filed January 13, 1909. Serial No. 472,078.

*To all whom it may concern:*

Be it known that I, EBER HUBBARD, a citizen of the United States, residing at Chicago, in the county of Cook and State of Illinois, have invented new and useful Improvements in Motive-Fluid-Supply Valves for Internal-Combustion Motors, of which the following is a specification, reference being had to the drawings forming a part thereof.

This application is a division of my pending application Serial No. 441,945, filed July 6, 1908.

The purpose of this invention is to provide an improved device of the nature of a valve and regulating means for the same for controlling the inlet for the motive fluid to the carbureter or mixer of the explosive fluid motor, particularly adapted for controlling the inlet of the liquid which requires distribution over an extended surface in order to obtain the necessary exposure for vaporization and air admixture. It consists in the features of construction shown and described as indicated in the claims.

In the drawings:—Figure 1 is a section of a carbureter provided with this invention, section being axial with respect to the supply inlet valve and the main outlet valve from the carbureter to the motor. Fig. 2 is a section at the line 2—2 on Fig. 1.

The carbureter shown in the drawings is of form adapted to be attached to the cylinder of gas engine covering the inlet port and comprising for that purpose the hood or chamber 1, into which the motive fluid is drawn past the valve, 2, which controls the outlet from the carbureting or mixing chamber, 3. The valve, 2, is shown connected with a governing device, the particular character and operation of which constitutes no part of this invention and need not be further described. It is, however, fully described and illustrated in my pending application Serial No. 441,993, filed in the United States Patent Office July 6, 1908. The chamber, 3, is open for inlet of air at the end remote from that near which the valve, 2, is located, said end opening being clearly shown at 4. The liquid supply for motive fluid is admitted from a pipe, 5, past a shut-off valve, 6, which is operated at will and enters the carbureting chamber, 3, through the bottom wall of that chamber, which is preferably flat; that is, of slight height or depth in comparison with its width, as can be understood by comparison of Figs. 1 and 2. The bottom wall of said chamber is provided with an inwardly extending boss, 7, which has a flat upper surface and is penetrated at the center by the inlet aperture from the valve, 6, with which connection is made by a nipple, 8, so that the supply of liquid discharged within the chamber, 3, at the center of the flat surface or tablet afforded by the top of the boss, 7, may flow over said tablet and thereby present a large area to the air for mixture therewith. The cap plate, 9, of the chamber, 3, affords guide bearing for the spindle, 10, of a disk valve, 11, which matches and faces the tablet formed by the boss, 7, in the chamber, 3, and is adapted to be lodged thereon and operated as a shut-off valve at the inlet aperture at the center of said tablet. To afford effective guidance for the spindle, 10, there is formed upon the cap plate an upstanding boss, 12, which is bored throughout for the spindle and also accommodates in the bore above the end of the spindle a spring, 13, which operates to yieldingly seat the disk valve, 11, on the tablet, 7, a plug, 14, secured into the upper end of the aperture in the boss serving to tension and retain the spring in action upon the end of the spindle. The stem, 15, of the valve, 2, obtains guidance by extending through a cap plate of the chamber, 3. Said stem, 15, of the valve, 2, is connected with the spindle, 10, of the disk, 11, by a lever, 17, for which there is provided a movable fulcrum, 18, mounted for sliding on the cap plate, 9, of the chamber, 3. The position of said fulcrum is designed to be adjusted so as to make the amount of motive fluid admitted past the disk valve, 11, such relatively to the amount of motive fluid admitted past the valve, 2, as to render the mixture most effective for explosion, and the position of the fulcrum will therefore ordinarily require adjustment only upon change in character of the motive fluid, but may at all times be adjusted to obtain the best results with the particular motive fluid used.

It will be observed that in practice the liquid supply conducted through the nipple, 8, being necessarily led from a source sufficiently higher than the tablet, 28, to be discharged therefrom when the valve is open, is at all times pressing upward against the under side of the flat valve disk, so that upon the slightest lifting of the disk from the tablet the supply spreads over the under face of the disk as well as the upper face of the tablet, and however thin the crevice opened the supply is thus dispersed over double the area of the tablet, and the air drawn in through the open end, 4, of the chamber is drawn through this narrow crevice and between the two films of liquid upon the two opposed surfaces respectively of the tablet and disk valve. There results a very thorough atomizing of the liquid supply by the action of the air wiping it off the two surfaces, and it is thus put into condition for very thorough mixture with the air; not only that entering thus between the two surfaces and operating as the means of taking up the oil, but also with the remaining quantity which enters through the open end, 4, and passes around the valve and tablet. Any remnant of oil remaining on the surfaces of the tablet and valve disk after each inward suction is thoroughly spread over the two disks, and if in sufficient quantity for such result is splattered and finely sprayed out from between them around the entire circumference upon the closing of the disk down onto the tablet, and is thereby thoroughly diffused for the next action,— that is, upon the next opening of the valve and intake of air. The extent of opening of the disk valve, 11, required for the maximum supply is very slight in comparison with the opening of the valve, 2, and nevertheless, the proper relation being once established between the area of the tablet, 7, and disk valve, 11, on the one hand, and the diameter of the valve, 2, the proper ratio between the two openings for all operations of the engine is substantially constant; and it will be noticed that the rate of supply of the motive fluid with any given opening of the disk valve is dependent not upon the size of the port or the diameter of the aperture through the nipple, 8, but, as indicated in the foregoing statement, upon the area of the tablet and disk valve, the capacity through the nipple, 8, being intentionally far in excess of the maximum requirement of the engine so that the opening effected between the tablet and the disk valve will not even closely approximate the total capacity or possible rate of supply through the nipple, 8. There is thus avoided all danger of clogging in the inlet passage which is experienced when the control is effected by a needle valve or valve of long taper operating in a necessarily small aperture. An obstruction such as a clot or impurity in the oil which might clog such a small aperture will at the worst only obstruct a very small portion of the area of the tablet and disk valve.

I claim:—

1. In a carbureting device for an internal combustion chamber, in combination with a chamber through which the air is drawn for discharge toward the motor cylinder, a main valve for controlling the volume of the supply to said cylinder; a tablet formed on the interior wall of such chamber; a liquid supply duct opening through such tablet; a flat-faced disk mounted for seating on such tablet to close the fluid inlet therethrough; means for withdrawing the disk from the tablet, and means for opening the main supply valve, said means constructed so as to cause a proportional and relatively small movement of the disk in comparison with the opening movement of the main valve.

2. A carbureter for an internal combustion motor comprising a chamber through which air is drawn toward the motor inlet; a main inlet valve for controlling the volume of the supply to the motor cylinder; a tablet formed on the inner wall of said chamber; a liquid supply duct opening through such tablet; a flat-faced disk mounted for seating on the tablet for closing such duct; means for operating the main inlet valve; means for operating said disk to withdraw it from the tablet, and means connecting said main controlling valve and said flat-faced disk for giving a proportional and relatively small movement to the disk in comparison with the opening movement of the main valve.

3. In a carbureting device for an internal combustion chamber, in combination with a chamber through which the air is drawn toward the motor cylinder, a main valve for controlling the volume of the supply to such cylinder; a tablet formed on the interior wall of such chamber; a liquid supply duct opening through such tablet, the upper surface of the tablet comprising, without other interruption, a relatively large area surrounding the fluid inlet; a flat-faced disk mounted for seating on such tablet to close the fluid inlet therethrough and contact with said tablet area around the inlet; means for withdrawing the disk from the tablet, and means for opening the main supply valve, said means constructed so as to cause a proportional and relatively small movement of the disk away from the tablet in comparison with the opening movement of the main valve.

4. In a carbureting device for an internal combustion motor, in combination with a chamber through which the air is drawn toward the motor cylinder, a main valve for controlling the volume of the supply from said chamber to such cylinder; an upwardly-facing tablet formed on the interior wall of such chamber anterior to said main valve; a liquid-supply duct opening upward through such tablet, the upper surface of the tablet comprising a relatively large area surrounding the fluid inlet; a flat-faced disk valve mounted for seating downwardly upon such tablet to close the fluid inlet there-through, said disk being adapted for contact with the extended tablet area around the inlet; lever connections between the stem of said main valve and the stem of said disk valve proportioned for transmitting reduced movement to the disk valve from the opening movement of the main valve.

5. In a carbureting device for an internal combustion motor, in combination with a chamber through which the air is drawn toward the motor cylinder, a main valve for controlling the volume of the supply from said chamber to such cylinder; an upwardly-facing tablet formed on the interior wall of such chamber anterior to said main valve; a liquid-supply duct opening upward through such tablet, the upper surface of the tablet comprising a relatively large area surrounding the fluid inlet; a flat-faced disk valve mounted for seating downwardly upon such tablet to close the fluid inlet there-through, said disk being adapted for contact with the extended tablet area around the inlet; lever connections between the stem of said main valve and the stem of said disk valve proportioned for transmitting reduced movement to the disk valve from the opening movement of the main valve, and a spring operating on the disk valve to hold the same normally seated.

6. In a carbureting device for an internal combustion motor, in combination with a chamber through which air is drawn toward the motor cylinder; a tablet formed on the interior wall of such chamber; a liquid-supply duct opening through such tablet; a flat-faced disk mounted for seating on such tablet to close the fluid inlet therethrough; means for withdrawing the disk from the tablet; a valve which controls communication of such chamber with the motor inlet; operating connections from such valve to the disk-operating means, said connections comprising a lever and a fulcrum for such lever which is movable therealong to vary the relative movement of said inlet valve and said disk.

Dated at Chicago, Illinois, January 2, 1909.

EBER HUBBARD.

Witnesses:
  Chas. S. Burton,
  M. Gertrude Ady.

---

Copies of this patent may be obtained for five cents each, by addressing the "Commissioner of Patents, Washington, D. C."